US012682872B2

(12) United States Patent
McCoy

(10) Patent No.: US 12,682,872 B2
(45) Date of Patent: Jul. 14, 2026

(54) EFFECTS UNIT DEVICE HAVING PHYSICAL AND VIRTUAL SIGNAL PROCESSING UTILITIES

(71) Applicant: Chaos Audio, LLC, Panama City Beach, FL (US)

(72) Inventor: Landon McCoy, Panama City Beach, FL (US)

(73) Assignee: Chaos Audio, LLC, Panama City Beach, FL (US)

( * ) Notice: Subject to any disclaimer, the term of this patent is extended or adjusted under 35 U.S.C. 154(b) by 1090 days.

(21) Appl. No.: 17/691,547

(22) Filed: Mar. 10, 2022

(65) Prior Publication Data

US 2022/0328026 A1 Oct. 13, 2022

Related U.S. Application Data

(60) Provisional application No. 63/173,172, filed on Apr. 9, 2021.

(51) Int. Cl.
*G10H 1/00* (2006.01)
*G10H 1/34* (2006.01)

(52) U.S. Cl.
CPC ......... *G10H 1/0025* (2013.01); *G10H 1/0083* (2013.01); *G10H 1/342* (2013.01); *G10H 2210/241* (2013.01); *G10H 2240/211* (2013.01)

(58) Field of Classification Search
CPC .... G10H 1/0025; G10H 1/0083; G10H 1/342; G10H 2210/241; G10H 2240/211
See application file for complete search history.

(56) References Cited

U.S. PATENT DOCUMENTS

2007/0169615 A1* 7/2007 Chidlaw .............. G10H 1/0091 84/723
2013/0291708 A1* 11/2013 Orshan ................ G10H 1/0091 84/626
2019/0019482 A1* 1/2019 Classe .................. G10H 1/0091
2022/0015633 A1* 1/2022 Levinson ................. H04R 3/04

* cited by examiner

*Primary Examiner* — Jianchun Qin
(74) *Attorney, Agent, or Firm* — AdamsIP, LLC; Edward Brinkley Garner, III; James Hunter Adams

(57) ABSTRACT

A system and method for an adaptable effects unit is provided. In one aspect, the system allows users to manipulate audio signals transmitted from a musical instrument prior to being output by a speaker. In another aspect, the system allows users to create virtual signal chains that may be used to alter audio signals of a musical instrument without the need of multiple effects units. In yet another aspect, the system may be used in a way that allows a user to customize the controls of a physical effects unit so that the controls better suit the user's needs. Generally, the system allows users alter and customize a physical effects unit via a user interface of a computing device. The physical effects unit is configured in a way such that it may receive instructions from the computing device.

20 Claims, 8 Drawing Sheets

EFFECTS UNIT DEVICE HAVING PHYSICAL AND VIRTUAL SIGNAL PROCESSING UTILITIES

CROSS REFERENCES

This application claims the benefit of U.S. Provisional Application No. 63/173,172, filed on Apr. 9, 2021, which application is incorporated herein by reference.

FIELD OF THE DISCLOSURE

The subject matter of the present disclosure refers generally to a system and method for an adaptable effects unit device.

BACKGROUND

Musicians have been manipulating audio signals of musical instruments via audio signal processing since the middle of 20$^{th}$ century. This has allowed musicians to create their own custom sound, which can become quite unique depending on the effects used and their order. Effects units may be used individually or "chained" together in a way that allows for multiple effects to be applied to the audio signal before being presented via a speaker. For instance, a user may use a loop effect pedal to record an audio signal, which the user may then cause to play on repeat. For instance, a user may pair an overdrive pedal with wah-wah pedal to cause a more dramatic wah-wah effect. This chaining of various effects units can become quite complex, but can also be quite rewarding for one's creativity.

However, the number of pedals required to recreate some classic sounds can vary greatly. If a musician wanted to create an effects board that may be used to replicate many classic rock sounds, they might be required combine a delay pedal, equalizer, and distortion pedal. If a musician wanted to create an effects board that may be used to replicate heavy metal sounds of the 90s, they may be required to combine a distortion pedal, equalizer pedal, flanger pedal, and delay pedal. The cost of these various pedals can add up quite quickly, which can price many musicians out of certain effect combinations. Further, musicians often affix multiple effects units to a single effects board, which can become quire bulky when multiple effects units are attached thereto. This can create a problem for musicians who want to travel with their effects units and the sounds created by the various combinations.

Therefore, there is a need in the art for a system and method that gives musicians the ability to manipulate sound output from an electrical instrument in any manner desired without the need of multiple pedals.

SUMMARY

A system and method for an adaptable effects unit device is provided. Generally, the system and methods of the present disclosure are designed to grant users highly customizable petal effects with a single physical pedal. More specifically, the system and method are designed to allow users to alter audio signals digitally using virtual effects units that may or may not be part of a virtual effects board, wherein said virtual effects board may comprise a plurality of virtual effects units changed together in a way that manipulates the audio signal in a specific sequence. The system generally comprises a physical effects unit, processor operably connected to the physical effects unit, power supply, computing entity having a user interface, and non-transitory computer-readable medium coupled to the processor and having instructions stored thereon. The system may also comprise a database operably connected to the processor, which may be used to store user data and synthesizer data therein.

Data within the system may be stored in various profiles, such as a user profile. The system may use synthesizer data in a way that allows a user to customize the controls of a physical control unit as well as create virtual signal chains comprising a plurality of virtual effects units and may use user data in a way that helps identify a particular user. A user may create a virtual signal chain that is linked to a physical effects unit, which may specify the order in which audio signal processing manipulates an audio signal prior to being presented via an output device. A user may create a virtual signal chain within the user interface. Types of virtual effects units that may be used to create the virtual signal chain include, but are not limited to, filter pedals, equalizer pedals, noise gates, tuner pedals, boost pedals, buffer pedals, gain pedals, modulation pedals, delay pedals, and reverb pedals, or any combination thereof. A user may specify the order in which the virtual effects units process the audio signal via the user interface.

A virtual effects board comprised of one or more virtual effects units may created by the user in the user interface. The user may chain the virtual effects units of the virtual effects board in any manner they please to create a custom sound. Additionally, a user may chain virtual effects boards in a way to create custom sounds. The user may also use the user interface to turn virtual effects units of a virtual effects board on or off, which will have the effect of altering the virtual signal chain. In some preferred embodiments, a user may have more than one virtual signal chain and/or virtual effects board\linked to more than one physical effects unit. This may allow a user to create physical versions of effects boards with fewer physical effects units than what otherwise might be possible using traditional effects units. In addition, multiple physical effects units may be chained together, wherein each physical effects unit may have their own virtual effects units therein. This may allow users to manipulate sounds produced by input devices without having to alter the virtual effects units and/or virtual effects boards of the physical effects units. Alternatively, a user may specify within the user interface when two or more physical effects units are linked together and change the order signal manipulation regardless of the physical order of the physical effects units.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other systems for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As will be evident from the disclosure provided below, the present invention satisfies the need for an adaptable effects unit.

Figure 1:
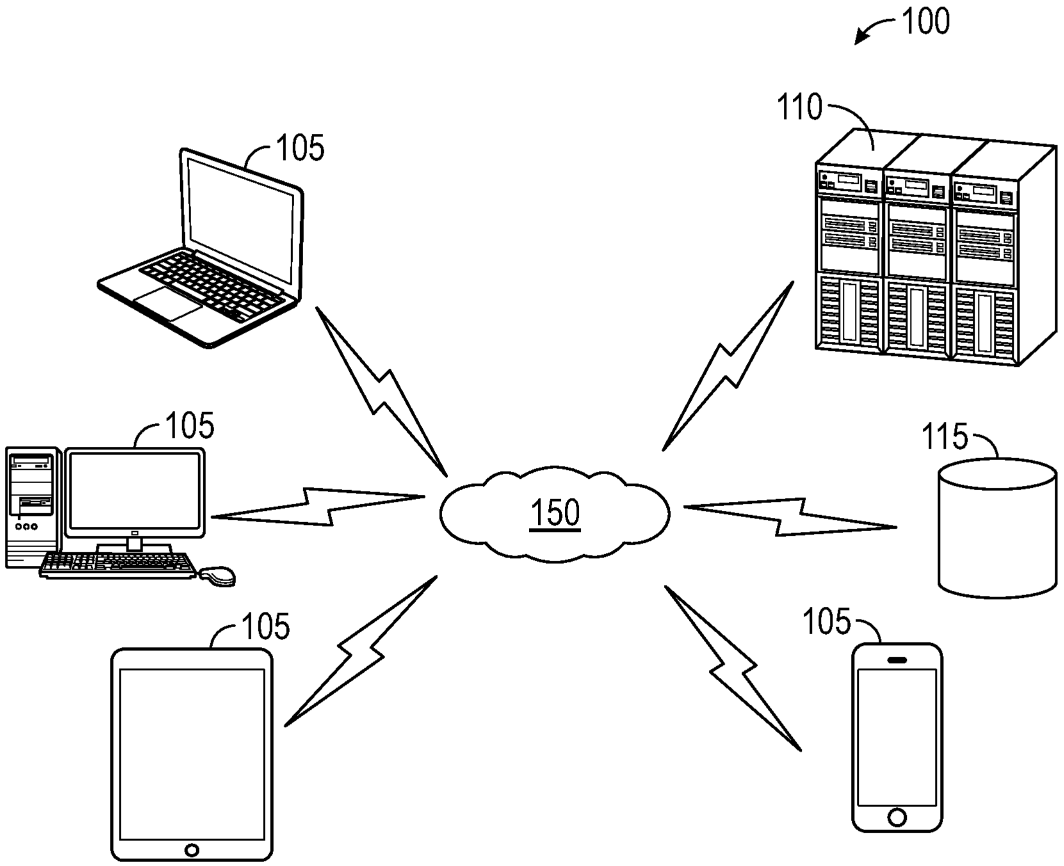
FIG. 1 is a diagram of an example environment in which techniques described herein may be implemented.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document.

Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
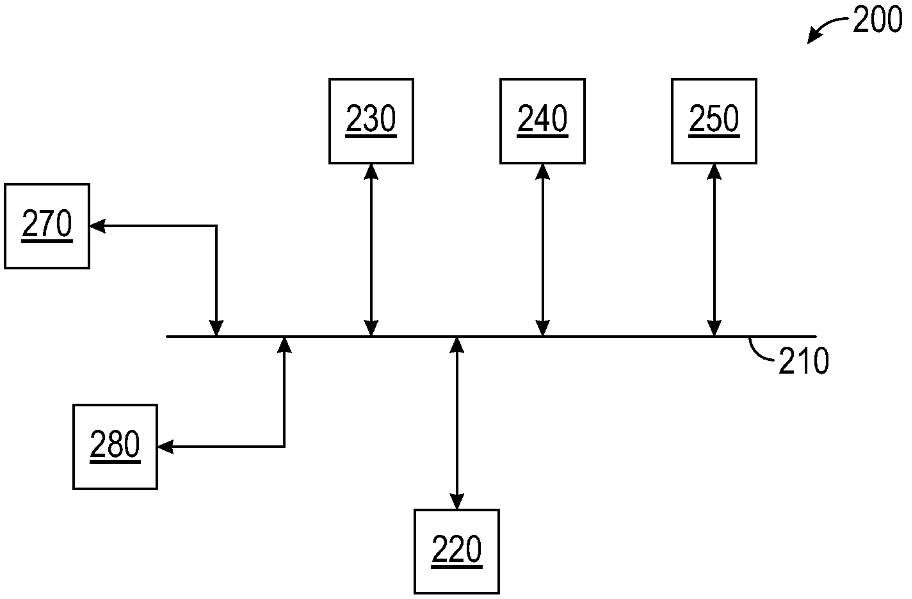
FIG. 2 is a diagram of an example environment in which techniques described herein may be implemented.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 410, applications run by a computing entity 200, and wireless communication by a communication interface 280 of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers 110, mainframes, cellular telephones, tablet computers, smart televisions, streaming devices, or any other similar device. Accordingly, the inventive subject matter disclosed herein, in full or in part, may be implemented or utilized in devices including, but are not limited to, laptops, desktops, workstations, personal digital assistants, servers 110, mainframes, cellular telephones, tablet computers, smart televisions, streaming devices, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device 408 and/or an output device 408. As used herein, an input device 408 may be defined as a device that allows a user 405 to input data and instructions that is then converted into a pattern of electrical signals in binary code that are comprehensible to a computing entity 200. An input device 408 of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device 408 may be defined as a device that translates the electronic signals received from a computing entity 200 into a form intelligible to the user 405. An output device 408 of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a smart watch may transfer data to a smartphone, wherein the smartphone may use that data in a manner separate from the smart watch.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
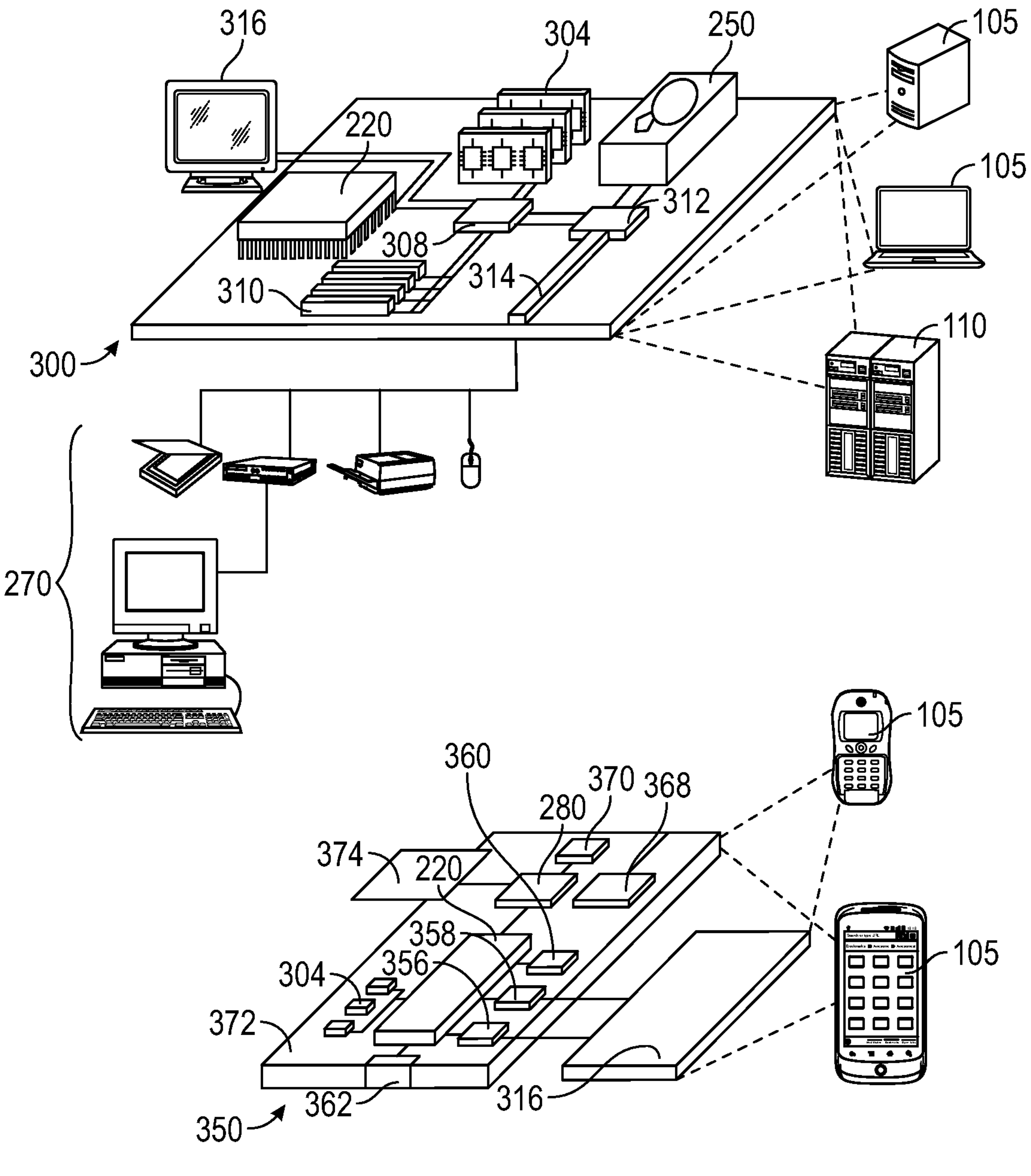
FIG. 3 is a diagram of an example environment in which techniques described herein may be implemented.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device 408, such as a display 316 coupled to the high-speed interface 308. In other implementations, multiple processors and/or multiple buses may be used, as appropriate, along with multiple memory units and/or multiple types of memory. Additionally, multiple computing devices 300 may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362.

The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 410, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may also comprise a power supply. The power supply may be any source of power that provides the system 400 with electricity. In one preferred embodiment, the system 400 may comprise of multiple power supplies that may provide power to the system 400 in different circumstances. For instance, the system 400 may be directly plugged into a stationary power source, which may provide power to the system 400 so long as it remains in one place. In a preferred embodiment, the stationary power source may be the electrical wiring that provides power to a power outlet. However, the system 400 may also be connected to a battery so that the system 400 may receive power even when it is not receiving power from a stationary power source. In one preferred embodiment, the system 400 may present an indicia via the user interface 411 when the power level of a battery supplying power to the system becomes low. This may provide the user with information that may indicate that they should plug the pedal into a stationary power source before the battery is depleted.

Figure 4:
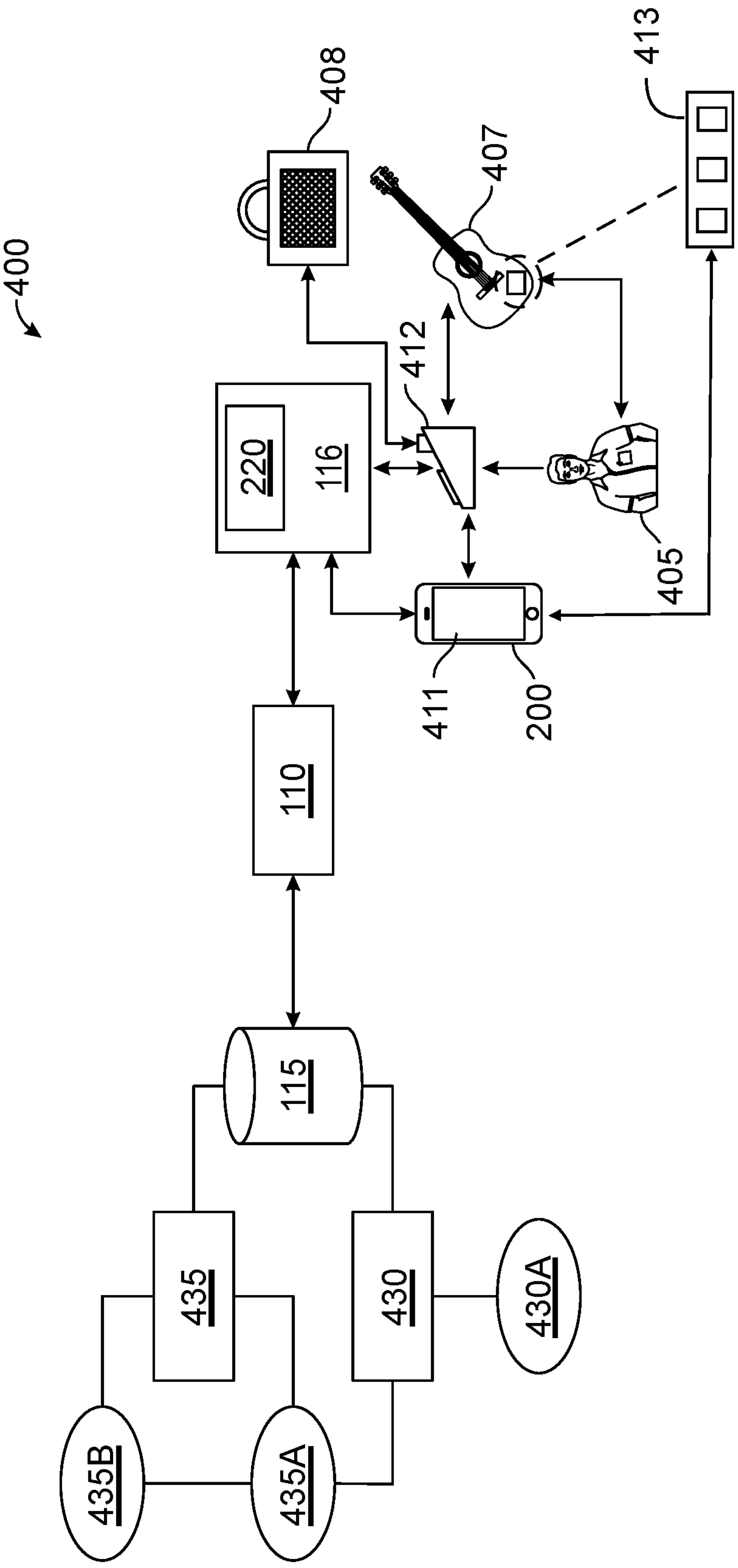
FIG. 4 is a diagram illustrating a system embodying features consistent with the principles of the present disclosure.
Figure 5:
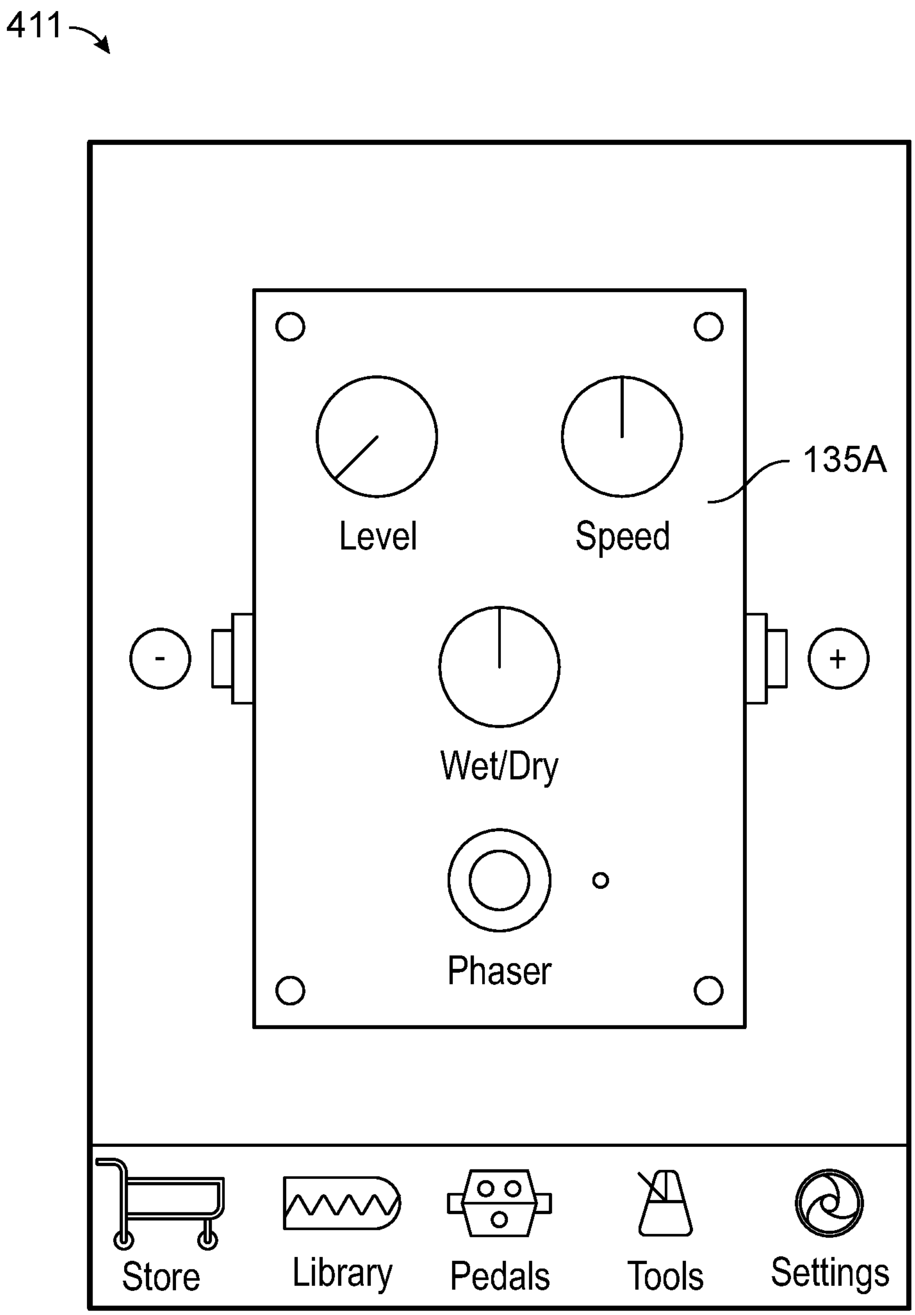
FIG. 5 is an illustration of a preferred embodiment of a user interface of a system embodying features consistent with the principles of the present disclosure.
Figure 6:
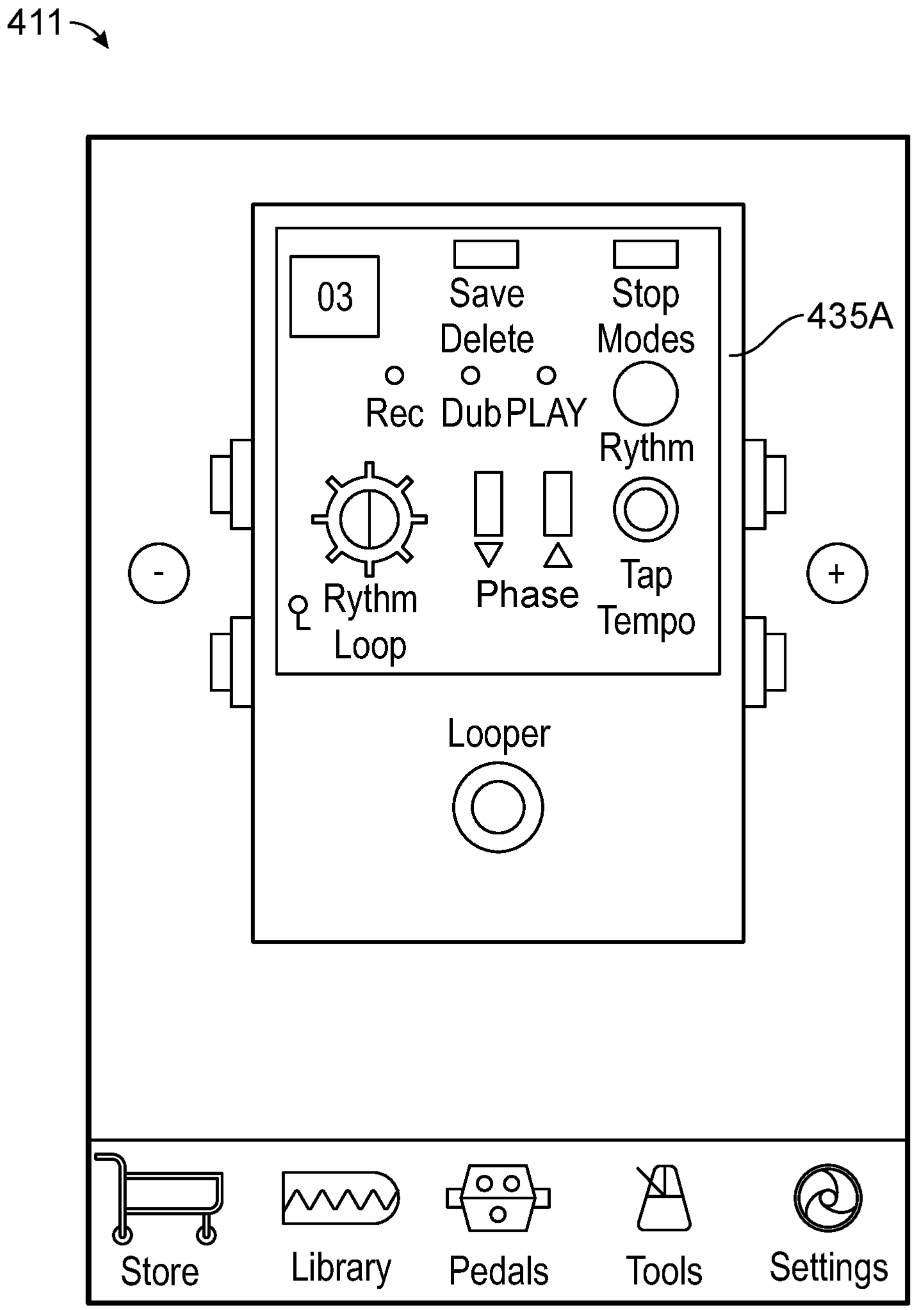
FIG. 6 is an illustration of a preferred embodiment of a user interface of a system embodying features consistent with the principles of the present disclosure.
Figure 7:
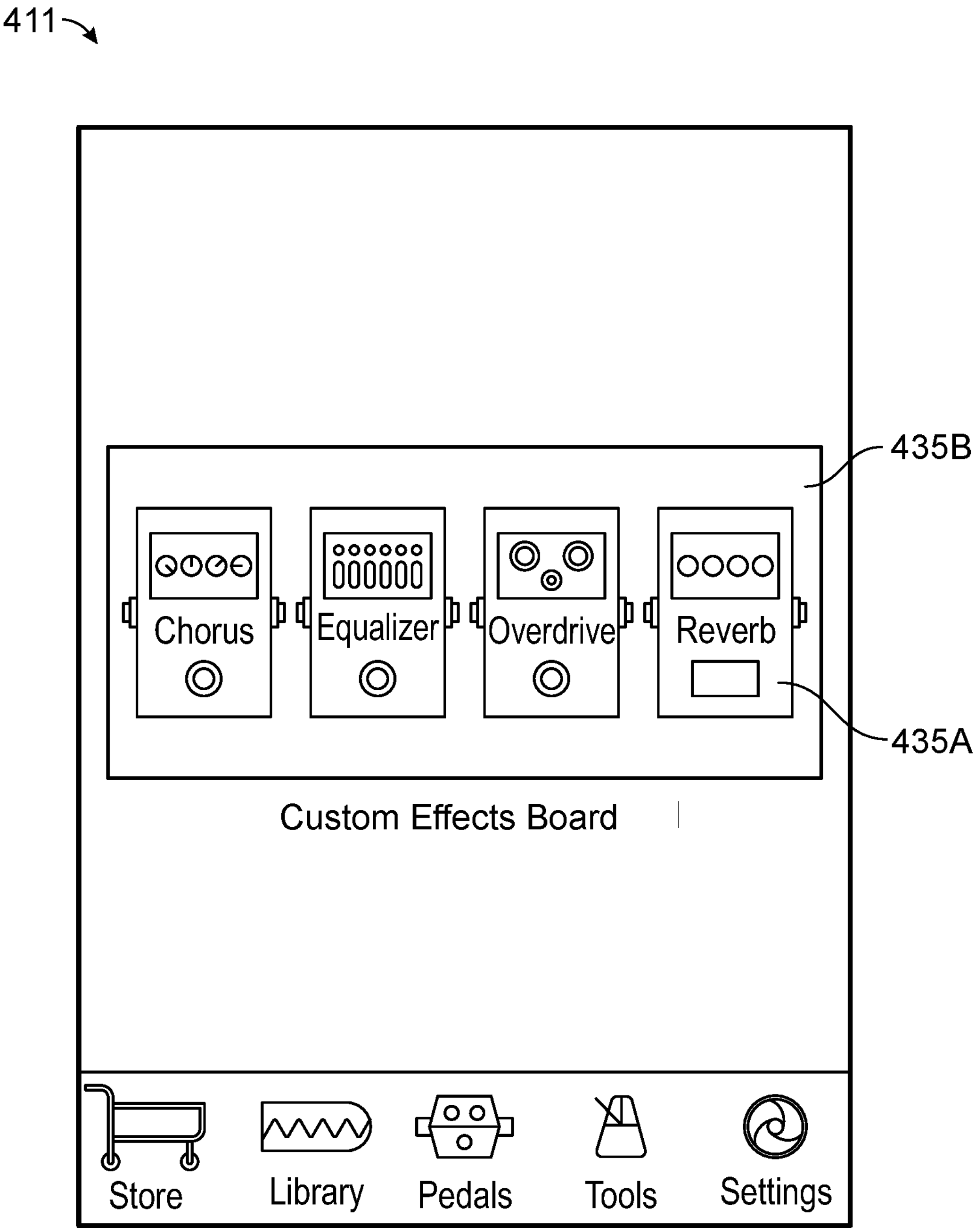
FIG. 7 is an illustration of a preferred embodiment of a user interface of a system embodying features consistent with the principles of the present disclosure.
Figure 8:
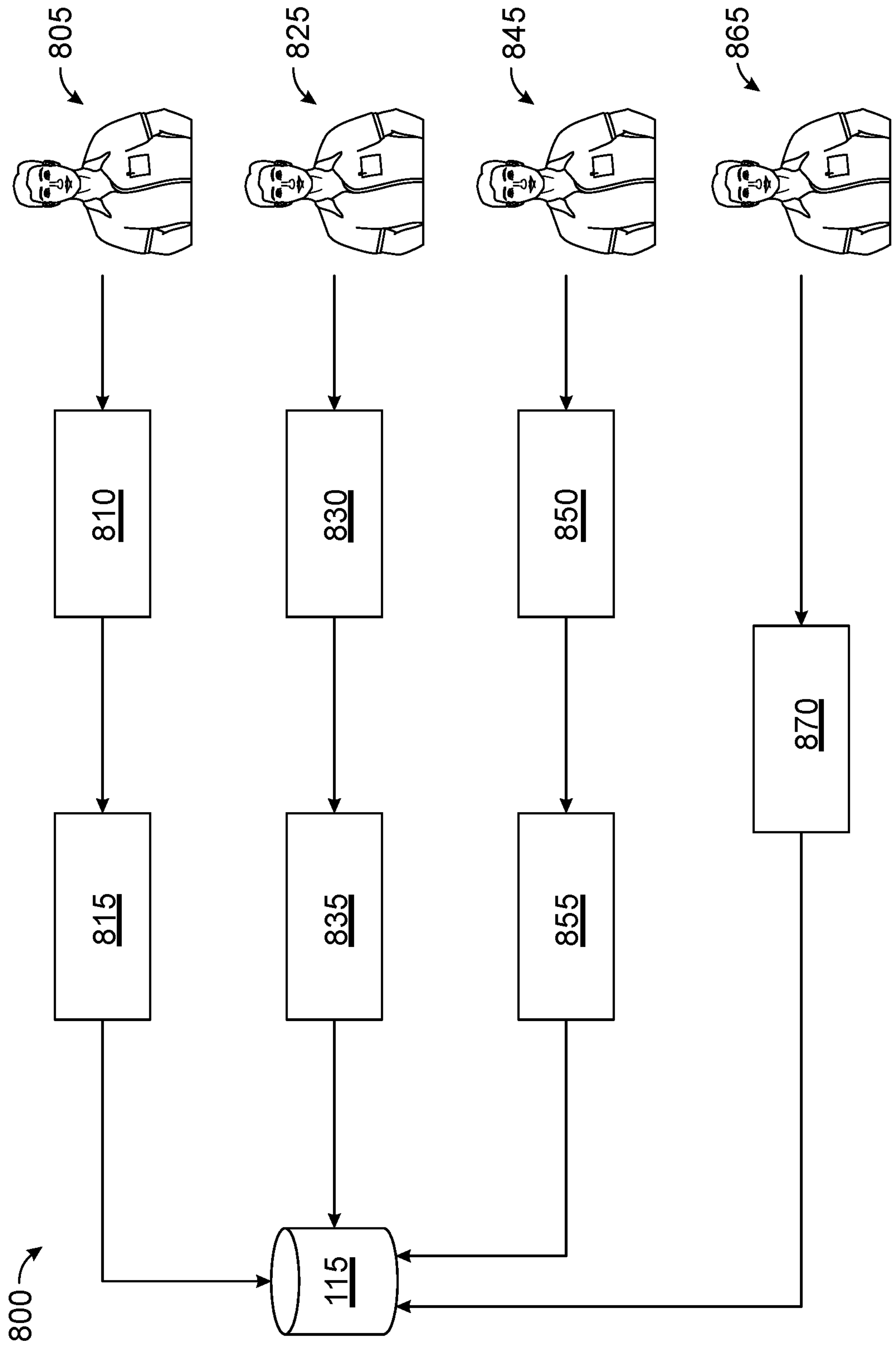
FIG. 8. is a diagram illustrating a system embodying features consistent with the principles of the present disclosure.
Figure 9:
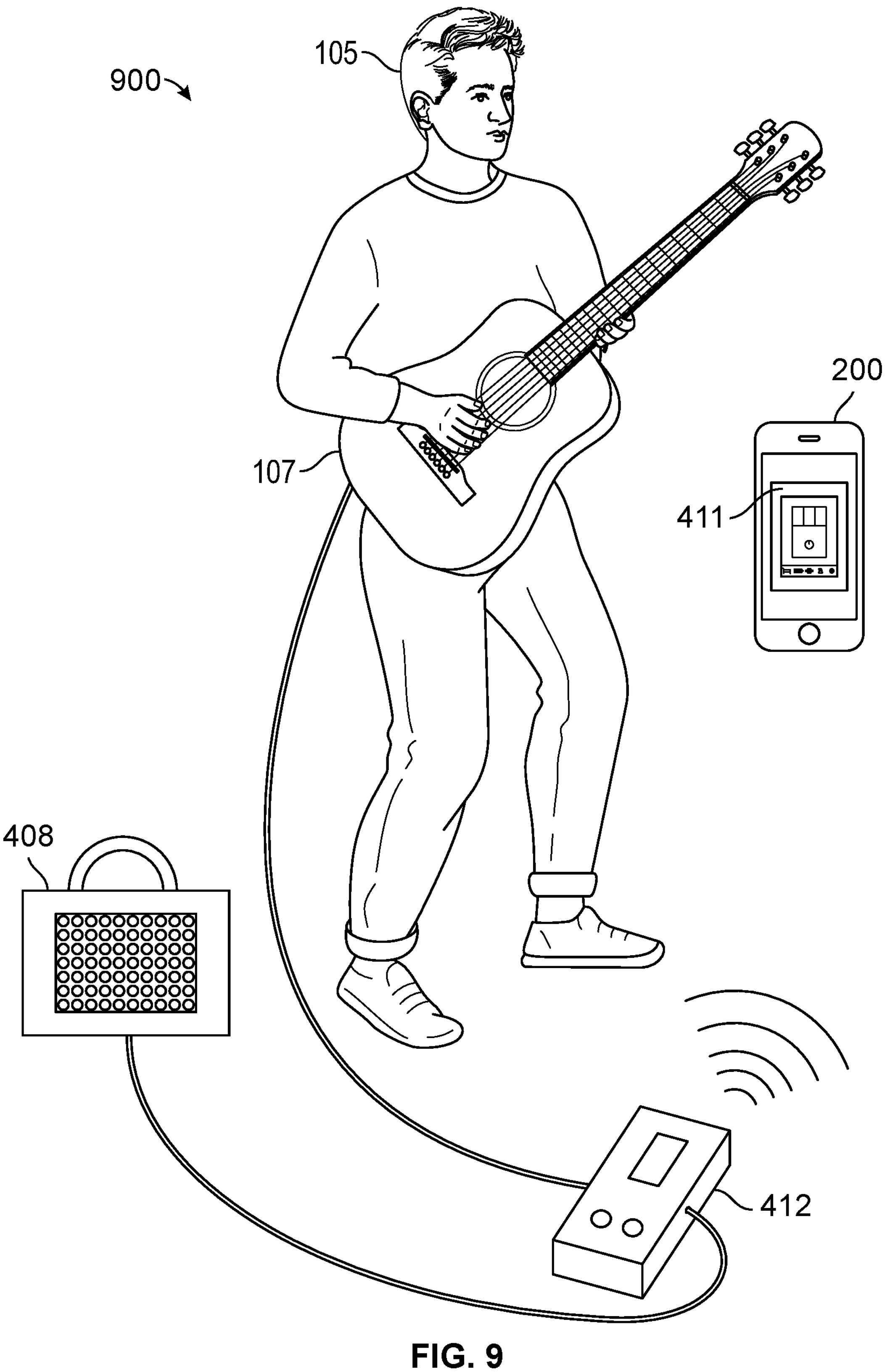
FIG. 9 is an environment view of a system being used by a user within an environment.

FIGS. 4-9 illustrate embodiments of a system 400 for an adaptable effects unit. FIG. 4 depicts a preferred embodiment of a system 400 designed to allow for the customization of the adaptable effects unit via a computing entity 200 having a user interface 411. FIGS. 5, 6, and 7 illustrate an embodiment of a user interface 411 of the system 400. FIG. 8 illustrates permission levels 800 that may be utilized by the present system 400 for controlling access to content 815, 835, 855 of the system 400. FIG. 9 illustrates the system 400 being used within an environment 900. It is understood that the various method steps associated with the methods of the present disclosure may be carried out as operations by the system 400 depicted in FIG. 4.

As illustrated in FIG. 4, the system 400 generally comprises a physical effects unit 412, processor 220 operably connected to the physical effects unit 412, power supply, computing entity 200 having a user interface 411, and non-transitory computer-readable medium 416 coupled to the processor 220 and having instructions stored thereon. In one embodiment, the system 400 may comprise a database 115 operably connected to the processor 220, which may be used to store user data 430A and synthesizer data 435 therein. In another preferred embodiment, a server 110 may be operably connected to the database 115 and processor 220, facilitating the transfer of information between the processor 220 and database 115. The system 400 preferably transmits user data 430A and synthesizer data 435 to the processor 220 via a network so that it may be presented to a user 405. In particular, the system 400 is designed to allow users 405 to customize the controls of the physical effects unit 412 as well as alter how the physical effects unit 412 processes audio signals received from a musical instrument 407 prior to being presented via an output device 408, such as a speaker or headphones. For instance, as illustrated in FIG. 5, a user 405 may alter the controls of the physical effects unit 412 such that it has "Level," "Speed," and "Wet/Dry" controls. For instance, as illustrated in FIG. 6, a user 405 may alter the controls of the physical effects unit 412 such that at least one switch causes a "Loop" effect.

Data within the system 400 may be stored in various profiles. In a preferred embodiment, the system 400 comprises user data 430A and synthesizer data 435 that may be stored in user profiles 430. A user profile 430 may be defined as a digital representation of a user's 405 identity, wherein data within said digital representation identifies various aspects of the user's 405 persona. Synthesizer data 435 may be defined as data that may be used to alter the controls of an effects unit. Synthesizer data 435 may include, but is not limited to, control unit type, control unit controls, control unit effects, virtual signal chains, or any combination thereof. Therefore, the system may use synthesizer data 435 to allow a user 405 to customize the controls of a physical control unit as well as create virtual signal chains comprising a plurality of virtual control units. User data 430A may be defined as data that may be used to identify a particular user 405 within the system 400. User data 430A may include, but is not limited to, name, date of birth, musical preferences, geolocation data, or any combination thereof. Therefore, the system may allow users 405 to input a multitude of data that may be helpful in identifying said user 405.

In one preferred embodiment, a user 405 may create a virtual signal chain that is linked to a physical effects unit 412. A signal chain may be defined as the order in which audio signal processing manipulates an audio signal prior to being presented via an output device 408. A user 405 may create a virtual signal chain within the user interface 411 using synthesizer data 435 comprising of virtual effects units 435A. In a preferred embodiment, types of virtual effects units 435A that may be used to create the virtual signal chain include, but are not limited to, filter pedals, equalizer pedals, noise gates, tuner pedals, boost pedals, buffer pedals, gain pedals, modulation pedals, delay pedals, and reverb pedals, or any combination thereof. A user 405 may specify the order in which the virtual effects units 435A process the audio signal via the user interface 411.

In one preferred embodiment, a user 405 may create a virtual effects board 435B that is linked to a physical effects unit 412. The user 405 may manipulate the virtual effects board 435B via the user interface 411. The user 405 may chain the virtual effects units 435A of the virtual effects board 435B in any manner they please to create a custom sound. By selecting a virtual effects unit 435A of the virtual effects board 435B within the user interface 411, a user 405 may customize the controls of the chosen virtual effects unit 435A for further customization of the audio signal processing the audio signal may undergo. For instance, a user 405 may select an equalizer pedal of the virtual effects board 435B using the user interface 411 to cause the sliders of the virtual equalizer pedal to be displayed, allowing the user 405 to change which frequency ranges the system will enhance or suppress. The user 405 may also turn virtual effects units 435A of a virtual effects board 435B on or off, which will have the effect of altering the virtual signal chain. For instance, a user 405 may activate a distortion pedal on a virtual pedal board within the user interface 411 to cause sound input into the physical effects unit 412 to be altered by the virtual signal chain in a way that includes reverberation.

In some preferred embodiments, a user 405 may have more than one virtual signal chain and/or virtual effects board 435B linked to more than one physical effects unit 412. This may allow a user 405 to create physical versions of effects boards with fewer physical effects units 412 than what otherwise might be possible using traditional effects units. For instance, a first physical effects unit 412 associated with a first virtual signal chain and/or first virtual effects board 435B may be physically linked to a second physical effects unit 412 associated with a second virtual signal chain and/or second virtual effects board 435B. By connecting an instrument 407 to the first physical effects unit 412, the first physical effects unit 412 to the second physical effects unit 412, and the second physical effects unit 412 to an output device 408, the order in which the audio signal is manipulated will be first by the first virtual signal chain and/or first virtual effects board 435B and second by the second virtual signal chain and/or second virtual effects board 435B. By switching the ordering of the first physical effects unit 412 and the second physical effects unit 412 on that same effects board, the order in which the audio signal is manipulated will be first by the second virtual signal chain and/or second virtual effects board 435B and second by the first virtual signal chain and/or first virtual effects board 435B. Alternatively, a user 405 may specify within the user interface 411 when two or more physical effects units 412 are linked together and change the order signal manipulation regardless of the physical order of the physical effects units 412. For instance, though a guitar may be directly linked to a first physical effects unit 412, a user 405 may specify within the user interface 411 that the virtual signal chain and/or virtual effects board 435B of the second physical effects unit 412 should be applied to an audio signal before the virtual signal chain and/or virtual effects board 435B of the first physical effects unit 412.

As illustrated in FIG. 4, the system 400 may comprise a database 115 operably connected to the processor 220. The database 115 may be operably connected to the processor 220 via wired or wireless connection. In a preferred embodiment, the database 115 is configured to store user data 430A and synthesizer data 435 therein. Alternatively, the user data 430A and synthesizer data 435 may be stored on the non-transitory computer-readable medium 416. The database 115 may be a relational database such that the user data 430A and synthesizer data 435 associated with each user profile 430 within the plurality of user profiles 430 may be stored, at least in part, in one or more tables. Alternatively, the database 115 may be an object database such that user data 430A and synthesizer data 435 associated with each user profile 430 within the plurality of user profiles 430 may be stored, at least in part, as objects. In some instances, the database 115 may comprise a relational and/or object database and a server 110 dedicated solely to managing the user data 430A and synthesizer data 435 in the manners disclosed herein.

As mentioned previously, one embodiment of the system 400 may further comprise a computing entity 200 operably connected to the processor 220. A computing entity 200 may be implemented in a number of different forms, including, but not limited to, servers 110, multipurpose computers, mobile computers, etc. For instance, a computing entity 200 may be implemented in a multipurpose computer that acts as a personal computer for a user 405, such as a laptop computer. For instance, components from a computing entity 200 may be combined in a way such that a mobile computing entity 200 is created, such as mobile phone. Additionally, a computing entity 200 may be made up of a single computer or multiple computers working together over a network. For instance, a computing entity 200 may be implemented as a single server 110 or as a group of servers 110 working together over and Local Area Network (LAN), such as a rack server 110 system 400. Computing entities 200 may communicate via a wired or wireless connection. For instance, wireless communication may occur using a Bluetooth, Wi-Fi, or other such wireless communication device.

The programming instructions responsible for the operations carried out by the processor 220 are stored on a non-transitory computer-readable medium ("CRM") 416, which may be coupled to the server 110 and/or database 115, as shown in FIG. 1. Alternatively, the programming instructions may be stored or included within the processor 220. Examples of non-transitory computer-readable mediums 416 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium 416.

In an embodiment, the system 400 may further comprise a user interface 411. A user interface 411 may be defined as a space where interactions between a user 405 and the system 400 may take place. In a preferred embodiment, the interactions may take place in a way such that a user 405 may control the operations of the system 400, and more specifically, allow a user 405 to manipulate soundwaves in a desired manner. A user 405 may input instructions to control operations of the system 400 manually using an input device. For instance, a user 405 may choose via the user interface 411 by way of an input device to customize a switch on a pedal so that it may cause a "loop" effect when activated by the user 405, wherein said input device may include, but is not limited to, electronic string instruments, electronic wind instruments, electronic percussion instruments, digital disc jockey controller, mouse, or touchscreen. A user interface 411 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 400 may present data of the user interface 411 to the user 405 via a display operably connected to the processor 220. A display may be defined as an output device 408 that communicates data that may include, but is not limited to, visual, auditory, cutaneous, kinesthetic, olfactory, and gustatory, or any combination thereof.

Information presented via a display may be referred to as a soft copy of the information because the information exists electronically and is presented for a temporary period of time. Information stored on the non-transitory computer-readable medium 416 may be referred to as the hard copy of the information. For instance, a display may present a soft copy of visual information via a liquid crystal display (LCD), wherein the hardcopy of the visual information is stored on a local hard drive. For instance, a display may present a soft copy of audio information via a speaker, wherein the hard copy of the audio information is stored on a flash drive. For instance, a display may present a soft copy of tactile information via a haptic suit, wherein the hard copy of the tactile information is stored within a database 115. Displays may include, but are not limited to, cathode ray tube monitors, LCD monitors, light emitting diode (LED) monitors, gas plasma monitors, screen readers, speech synthesizers, haptic suits, speakers, and scent generating devices, or any combination thereof. In a preferred embodiment, users 405 may access data of the system 400 via the user interface 411, which may be accomplished by causing the processor 220 to query the non-transitory computer-readable medium 416 and/or database 115. The non-transitory computer-readable medium 416 and/or database 115 may then transmit data back to the processor 220, wherein the processor 220 may present it to the user 405 via a display. This information may be presented to the user 405 in a way such that the user 405 may choose how a pedal manipulates sound from an instrument 407.

In yet another preferred embodiment, the system 400 may further comprise at least one controller 413, wherein said at least one controller 413 is configured to send synthesizer data 435 to the computing entity 200 in the ways outlined above. In a preferred embodiment, the at least one controller 413 includes, but is not limited to, a switchboard controller, expression controller, and gyroscopic/accelerometer-based controller. The switchboard controller comprises a plurality of switches associated with plurality of virtual signal chains and allows a user to switch to a particular virtual signal chain of said plurality of virtual signal chains by interacting with a particular switch of said plurality of switches. The expression controller is configured to read a control voltage that may be altered by a user 405 via a physical effects unit 412. The control voltage of the expression controller is then read by the system 400 and used to change a virtual effect and/or virtual string chain. The gyroscopic/accelerometer-based controller is configured to attach to the user's 405 instrument 407 and adjust virtual effects units 435A and/or virtual signal chains based on the motion of the user's 405 instrument 407.

In a preferred embodiment, the at least one controller 413 is connected to the system 400 via a wireless communication device. Rather than synthesizer data 435 being sent directly from the at least one controller to a physical effects unit 412, the user 405 may connect the at least one controller 413 and the physical effects unit 412 to a computing entity 200 having the user interface 411. Soundwave data would be received by the computing entity 200 from the instrument 407 along with synthesizer data 435 from the at least one controller 413. The computing entity 200 may then process the soundwave data using the synthesizer data 435 of the at least one controller 413, depending on input by the user 405 within the user interface 411 and/or synthesizer data 435 from the physical effects unit 412. Therefore, in some preferred embodiments, the computing entity 200 may act as a hub, facilitating the transfer of data between the user's 405 at least one controller 413 and physical effects unit 412. In a preferred embodiment, the functionality of each at least one controller 413 is reprogrammable within the user interface 411 of the computing entity 200, allowing the user 405 to adjust the functionality of each at least one controller 413.

Because the computing entity 200 can act as a wireless hub facilitating the transfer of data between the at least one controller 413 and physical effects unit 412, access to the same library of virtual effects unit 435A may be available to a physical effects unit 412 via the computing entity 200. Each virtual effects unit 435A of the system 400 is an independent, compiled program, which fully encapsulates the necessary algorithms and adjustable parameters to produce the desired sound effect. In some preferred embodiments, the various devices of the system 400 may be associated with a user's user profile 430. Virtual effects unit 435A and virtual signal chains of a user's 405 user profile 430 may be able to be shared between the various devices connected to the system 400 that are associated with a user's 405 user profile 430. In other preferred embodiments, the virtual effects unit 435A and virtual signal chains may be contained within a computing entity 200 configured to receive soundwave data from an instrument 407, allowing users 405 to interface their instrument 407 with their computing entity 200 and apply virtual effects unit 435A and/or virtual signal chains using just said computing entity 200.

A user 405 may purchase virtual effects unit 435A using a Point of Sale system 400 operably connected to the system 400. In an embodiment, the computing entity 200 hosting a user interface 411 may be operably connected to the Point of Sale system in a way such that the Point of Sale system may communicate with the database 115 so that it alters which virtual effects unit 435A are available to a user 405 within their user profile 430. When a virtual effects unit 435A is purchased by the user 405, the Point of Sale system may automatically communicate with the database 115 such that the purchased virtual effects unit 435A is automatically added to the user's 405 user profile 430. Virtual effects units 435A are preferably linked to a user's 405 user profile 430 in a way such that any device also associated with the user's 405 user profile 430 may have access to any purchased virtual effects units 435A without the need for the user 405 to purchase the virtual effects units 435A for each device. For instance, the user interface may ask the user 405 which pedals operably connected to the system 400 and associated with a user's 405 user profile 430 should be allowed to access the purchased virtual effects unit 435A. For instance, at least one controllers 413 operably connected to a user's 405 computing entity 200 and associated with a user's 405 user profile 430 may be able to access purchased virtual effects unit 435A and subsequently alter soundwave data using said purchased virtual effects unit 435A.

To prevent un-authorized users 405 from accessing data within the user profiles 430 of the system 400, the system 400 may employ a security method. As illustrated in FIG. 8, the security method of the system 400 may comprise a plurality of permission levels 800 that may allow a user 405 to view content 815, 835, 855 within the database 115 while simultaneously denying users 405 without appropriate permission levels 800 the ability to view said content 815, 835, 855. To access the data stored within the database 115, users 405 may be required to make a request via a user interface 411. Access to the data within the database 115 may be granted or denied by the processor 220 based on verification of a requesting user's 805, 825, 845 permission level 800. If the requesting user's 805, 825, 845 permission level 800 is sufficient, the processor 220 may provide the requesting user 805, 825, 845 access to content 815, 835, 855 stored within the system 400. Conversely, if the requesting user's 805, 825, 845 permission level 800 is insufficient, the processor 220 may deny the requesting user 805, 825, 845 access to content 815, 835, 855 stored within the system 400. In an embodiment, permission levels 800 may be based on user roles 810, 830, 850 and administrator roles 870, as illustrated in FIG. 8. User roles 810, 830, 850 allow users 405 to access content 815, 835, 855 that a user 405 has uploaded and/or otherwise obtained through use of the system 400. Administrator roles 870 allow administrators 865 to access system 400 wide data, including managerial permissions, as well as assign new tasks to other users 405.

In an embodiment, user roles 810, 830, 850 may be assigned to a user 405 in a way such that a requesting user 805, 825, 845 may access user profiles 430 via the user interface 411. To access the data within the database 115, a user 405 may make a user request via the user interface 411 to the processor 220. In an embodiment, the processor 220 may grant or deny the request based on the permission level 800 associated with the requesting user 805, 825, 845 assigned via user roles 810, 830, 850. Only users 405 having appropriate user roles 810, 830, 850 or administrator roles 870 may access the content 815, 835, 855. For instance, as illustrated in FIG. 8, requesting user 1 805 has a permission level 800 to view user 1 content 815 whereas requesting user 2 825 has a permission level 800 to view user 1 content 815, user 2 content 835, and user 3 content 855. Alternatively, content 815, 835, 855 may be restricted in a way such that a user 405 may only view a limited amount of content 815, 835, 855. For instance, requesting user 3 845 may be granted a permission level 800 that only allows them to view user 3 content 855 related to a particular virtual effects board 435B. Therefore, the permission levels 800 of the system 400 may be assigned to users 405 in various ways without departing from the inventive subject matter described herein.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for manipulating audio data comprising:

a physical effects unit having at least one virtual effects unit stored as executable instructions in memory of the physical effects unit, wherein said physical effects unit manipulates an audio signal into a manipulated audio signal using said at least one virtual effects unit by executing said executable instructions within the physical effects unit, a processor operably connected to said physical effects unit, a computing device operably connected to said processor and having a user interface comprising a graphical user interface configured to present a virtual effects board, wherein said user interface allows a user to manipulate controls of said physical effects unit, a database operably connected to said processor, wherein said database contains a user profile containing user data and synthesizer data including control unit type and control unit controls for reconfiguring a control surface of the physical effects unit, wherein said database contains said at least one virtual effects unit, and a non-transitory computer-readable medium coupled to said processor, wherein said non-transitory computer-readable medium contains instructions stored thereon, which, when executed by said processor, cause said processor to perform operations comprising:

receiving synthesizer data from said database wherein the synthesizer data defines at least one of (i) a control unit type or (ii) control unit controls for the physical effects unit, altering said controls of said physical effects unit using said synthesizer data, transmitting said at least one virtual effects unit to said physical effects unit as executable code for installation in memory of the physical effects unit, and transmitting a manipulation order to said physical effects unit that specifies an execution sequence of the at least one virtual effects unit within a virtual signal chain.

2. The system of claim 1, further comprising a control board of said physical effects unit, wherein said at least one virtual effects unit is saved within memory of said control board as a compiled program executable by the physical effects unit to manipulate the audio signal.

3. The system of claim 1, wherein said processor sends said manipulation order to said physical effects unit, wherein said manipulation order instructs said physical effects unit of a sequence in which said at least one virtual effects unit is to manipulate said audio signal and create said manipulated audio signal without requiring reordering of physical cabling between effects devices.

4. The system of claim 1, wherein said user interface comprises a virtual effects board having said at least one virtual effects unit and configured to allow a user to chain a plurality of virtual effects units into a user-defined virtual signal chain.

5. The system of claim 4, wherein said manipulation order determines a sequence in which at least one virtual effects unit of said virtual effects board manipulate said audio signal by specifying an ordered execution graph of the virtual effects units.

6. The system of claim 1, further comprising an input device, wherein said input device is operably connected to said physical effects unit, and wherein said audio signal produced by said input device is transferred to said physical effects unit to be manipulated.

7. The system of claim 6, wherein said input device is at least one of an electronic string instrument, electronic wind instrument, electronic percussion instrument, and digital disc jockey controller.

8. The system of claim 6, further comprising an output device operably connected to said physical effects unit and configured to receive said manipulated audio signal.

9. A system for manipulating audio data comprising:

a physical effects unit having a control board, wherein at least one virtual effects unit is saved within memory of said control board as a compiled program configured to be executed to apply an audio effect to the audio signal, wherein said physical effects unit manipulates an audio signal into a manipulated audio signal using said at least one virtual effects unit by executing the virtual effects unit stored within the memory of said control board, a processor operably connected to said physical effects unit, a computing device operably connected to said processor and having a user interface, wherein said user interface allows a user to manipulate controls of said physical effects unit, an input device operably connected to said physical effects unit and configured to transmit said audio signal thereto, an output device operably connected to said physical effects unit and configured to receive said manipulated audio signal, wherein said output device presents said manipulated audio signal transmitted by said physical effects unit, and a non-transitory computer-readable medium coupled to said processor, wherein said non-transitory computer-readable medium contains instructions stored thereon, which, when executed by said processor, cause said processor to perform operations comprising:

receiving synthesizer data from a user profile of said user stored in the database and comprising user data identifying the user and synthesizer data defining a virtual signal chain, altering said controls of said physical effects unit using said synthesizer data by changing at least one of (i) a control type or (ii) a control mapping of a physical control of the physical effects unit, transmitting said at least one virtual effects unit to said physical effects unit as a compiled program configured to be executed by the physical effects unit to process the audio signal, and transmitting a manipulation order to said physical effects unit that specifies an ordered execution of the at least one virtual effects unit stored in the control board memory.

10. The system of claim 9, wherein said processor sends said manipulation order to said control board, wherein said manipulation order instructs said control board of a sequence in which said at least one virtual effects unit is to manipulate said audio signal and create said manipulated audio signal by executing the at least one virtual effects unit stored in memory of the control board.

11. The system of claim 9, wherein said user interface comprises a virtual effects board having said at least one virtual effects unit and configured to allow a user to add, remove, and reorder virtual effects units within the virtual effects board.

12. The system of claim 11, wherein said manipulation order determines a sequence in which at least one virtual effects unit of said virtual effects board manipulate said audio signal by specifying an ordered execution of the virtual effects units within the physical effects unit.

13. The system of claim 9, wherein said input device is operably connected to said control board via a wireless communication device configured to transmit the audio signal as digital audio data to the physical effects unit for processing by the at least one virtual effects unit.

14. The system of claim 9, wherein said input device is at least one of an electronic string instrument, electronic wind instrument, electronic percussion instrument, and digital disc jockey controller.

15. The system of claim 9, further comprising an output device operably connected to said physical effects unit and configured to receive said manipulated audio signal.

16. A method for using an adaptable effects unit comprising steps of:

obtaining a physical effects unit, obtaining an input device configured to create an audio signal, obtaining a computing device configured to alter controls of said physical effects unit, altering said controls of said physical effects unit using said computing device by transmitting synthesizer data that reprograms a control mapping of at least one physical control of the physical effects unit, selecting a virtual signal chain using said computing device, wherein the virtual signal chain defines an ordered execution of a plurality of virtual effects units within the physical effects unit wherein said virtual signal chain comprises at least one virtual effects unit that is executable by the physical effects unit to cause said physical effects unit to create a manipulated audio signal from said audio signal, connecting said input device to said physical effects unit in a way such that said physical effects unit is configured to receive said audio signal from said input device, and manipulating said input device to produce said audio signal, wherein said audio signal is transmitted to said physical effects unit.

17. The method of claim 16, further comprising the step of: obtaining an output device configured to present said manipulated audio signal.

18. The method of claim 17, further comprising the step of:

connecting said physical effects unit to said output device in a way such that said physical effects unit is configured to transmit said manipulated audio signal to said output device.

19. The method of claim 16, further comprising a user interface of said computing device, wherein said user interface allows a user to alter controls of said physical effects unit using synthesizer data.

20. The method of claim 19, wherein said synthesizer data is saved within a user profile.

* * * * *